(12) United States Patent
Zhou et al.

(10) Patent No.: US 9,276,771 B1
(45) Date of Patent: Mar. 1, 2016

(54) LOSSLESS MULTIPATH TABLE COMPRESSION

(71) Applicant: Google Inc., Mountain View, CA (US)

(72) Inventors: Junlan Zhou, Sunnyvale, CA (US); Ji Zhengrong, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 207 days.

(21) Appl. No.: 14/039,586

(22) Filed: Sep. 27, 2013

(51) Int. Cl.
*H04J 1/16* (2006.01)
*H04L 12/54* (2013.01)

(52) U.S. Cl.
CPC ..................... *H04L 12/56* (2013.01)

(58) Field of Classification Search
CPC ....................................... H04L 12/26
USPC ............................................... 370/235
See application file for complete search history.

(56) References Cited

U.S. PATENT DOCUMENTS

| | | | |
|---|---|---|---|
| 6,779,030 B1* | 8/2004 | Dugan et al. | 709/223 |
| 7,903,666 B1 | 3/2011 | Kumar et al. | |
| 7,936,764 B1 | 5/2011 | Krishnan | |
| 2007/0087756 A1* | 4/2007 | Hoffberg | 455/450 |
| 2009/0252033 A1* | 10/2009 | Ramakrishnan et al. | 370/228 |
| 2013/0182712 A1* | 7/2013 | Aguayo et al. | 370/395.53 |
| 2013/0279503 A1 | 10/2013 | Chiabaut | |

* cited by examiner

*Primary Examiner* — Wei Zhao
(74) *Attorney, Agent, or Firm* — Edward A. Gordon; Foley & Lardner LLP

(57) ABSTRACT

Exemplary embodiments provide compression of data that will be saved to a multipath table for a given set of routing rules. Thus, the total space required in the multipath table for storing a given set of routing rules is reduced. A routing rule associated with a network switch may be represented using a building block that includes one or more entries. The one or more entries form an unordered enumeration of egress ports of the network switch. In the routing rule, the weight of an egress port is represented by the number of times the egress port appears in the building block. Compression of data may be accomplished by combining one or more of the routing rules into a same building block having one or more entries. The building block may be stored in the multipath table, hereby programming the one or more of the rules into the multipath table.

13 Claims, 9 Drawing Sheets

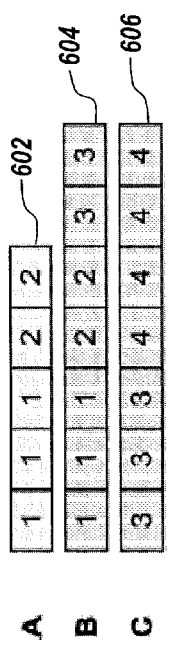
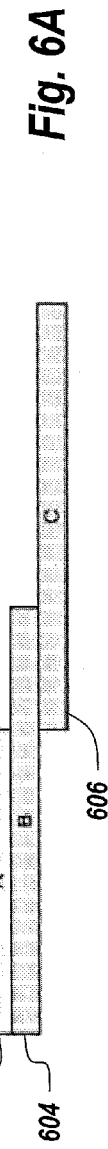
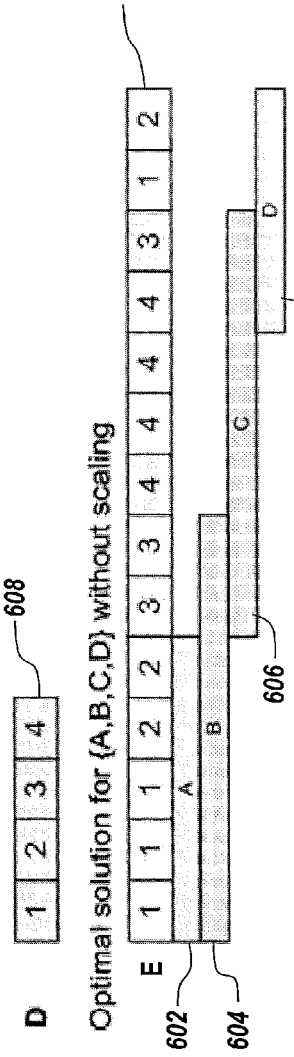
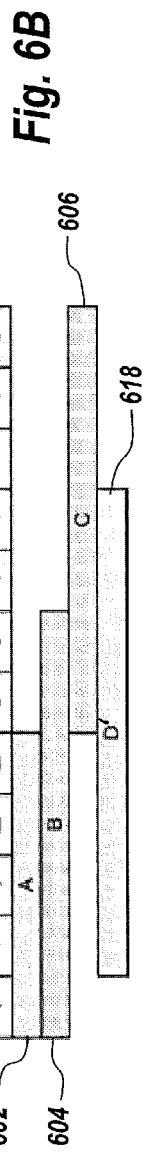
Fig. 6A
Fig. 6B

LOSSLESS MULTIPATH TABLE COMPRESSION

BACKGROUND

In conventional networks, various routing techniques may be used to transport data packets through the network. There may be multiple paths to transport the data packets between two nodes of the network. The network may be configured to split the traffic among these multiple paths. For example, a multipath routing technique may be used to determine how the traffic will be split among the multiple paths in the network. Exemplary multipath routing techniques may include Weighted Cost MultiPath (WCMP) routing and Equal Cost MultiPath (ECMP) routing. WCMP routing technique may distribute the traffic among available paths based on a set of pre-determined ratios. If the pre-determined ratios are equal, the WCMP routing may be a ECMP routing where the traffic is distributed evenly among the available paths. WCMP routing may be accomplished using a multipath table.

In conventional networks, the number of entries supported by a multipath table may be limited and may not be able accommodate the various multi-path forwarding rules to support hundreds to thousands of traffic flows. Therefore, a technique is needed to reduce the number of entries to be programmed into a multipath table for a given set of WCMP forwarding rules.

SUMMARY

Various embodiments provide a computer-implemented method comprising obtaining a set of routing rules including at least a first rule and a second rule. The first rule and the second rule each includes one or more building blocks. The method further comprises programming the first rule into a multipath table of a network supporting weighted cost multipath routing. It is determined whether there is an overlap between the second rule and the first rule. When it is determined that there is the overlap between the second rule and the first rule, one or more remaining building blocks of the second rule that remain outside the overlap to the one or more building blocks of the first rule are added to the multipath table. The method also comprises adding all of the one or more building blocks of the second rule to the multipath table when it is determined that there is no overlap between the second rule and the first rule.

Some embodiments provide a method comprising obtaining a plurality of routing rules ordered in a first order. A compression algorithm is performed on the plurality of routing rules to compress the plurality of routing rules into a first set of building blocks by determining two or more of the plurality of routing rules that overlap. The method further comprises storing the first set of building blocks in a first multipath table of a network supporting weighted cost multipath routing. The plurality of routing rules are re-ordered in a second order. The compression algorithm is performed on the re-ordered plurality of routing rules. The performing comprises compressing the re-ordered plurality of routing rules to a second set of building blocks by determining two or more of the re-ordered plurality of routing rules that overlap. The performing further comprises storing the second set of building blocks in a second multipath table and determining if the second multipath table occupies less memory space than the first multipath table.

Various embodiments provide a computer-implemented method comprising obtaining a plurality of routing rules. A first rule of the plurality of rules includes one or more entries. The method further comprises performing a compression algorithm to compress the plurality of routing rules into a first set of building blocks by determining two or more of the plurality of routing rules that overlap. The first set of building blocks are stored in a first multipath table of a network supporting weighted cost multipath routing. The method further includes scaling up the first rule by adding at least one additional entry to the one or more entries of the first rule. The compression algorithm is performed on the plurality of routing rules including the scaled up first rule to compress the plurality of routing rules into a second set of building blocks. The second set of building blocks is stored in a second multipath table. The method also comprises determining if the second multipath table occupies less memory space than the first multipath table.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 6A depicts an exemplary embodiment that enters three routing rules to a multipath table using a compression algorithm;

FIG. 6B depicts an exemplary embodiment that enters four routing rules using scaling to a multipath table using a compression algorithm;

DETAILED DESCRIPTION

The present invention concerns compressing data that will be saved to a multipath table for a given set of routing rules. A routing rule associated with a network switch may be represented using a building block that includes one or more entries. The one or more entries form an unordered enumeration of egress ports of the network switch. In the routing rule, the weight of an egress port is represented by the number of times the egress port appears in the building block. Accordingly, the routing rule may indicate a traffic load balancing ratio among the ports of the switch based on the weights of the ports. According to exemplary embodiments, compression of data may be accomplished by combining one or more of the routing rules into a same building block having one or more entries. The building block may be stored in the multipath table, hereby programming the one or more of the rules into the multipath table.

According to various embodiments, the exemplary algorithms used for reducing the total space in the multipath table for a given set of routing rules may include the greedy algorithm and the non-deterministic polynomial-time (N-P) hard algorithm.

Figure 1:
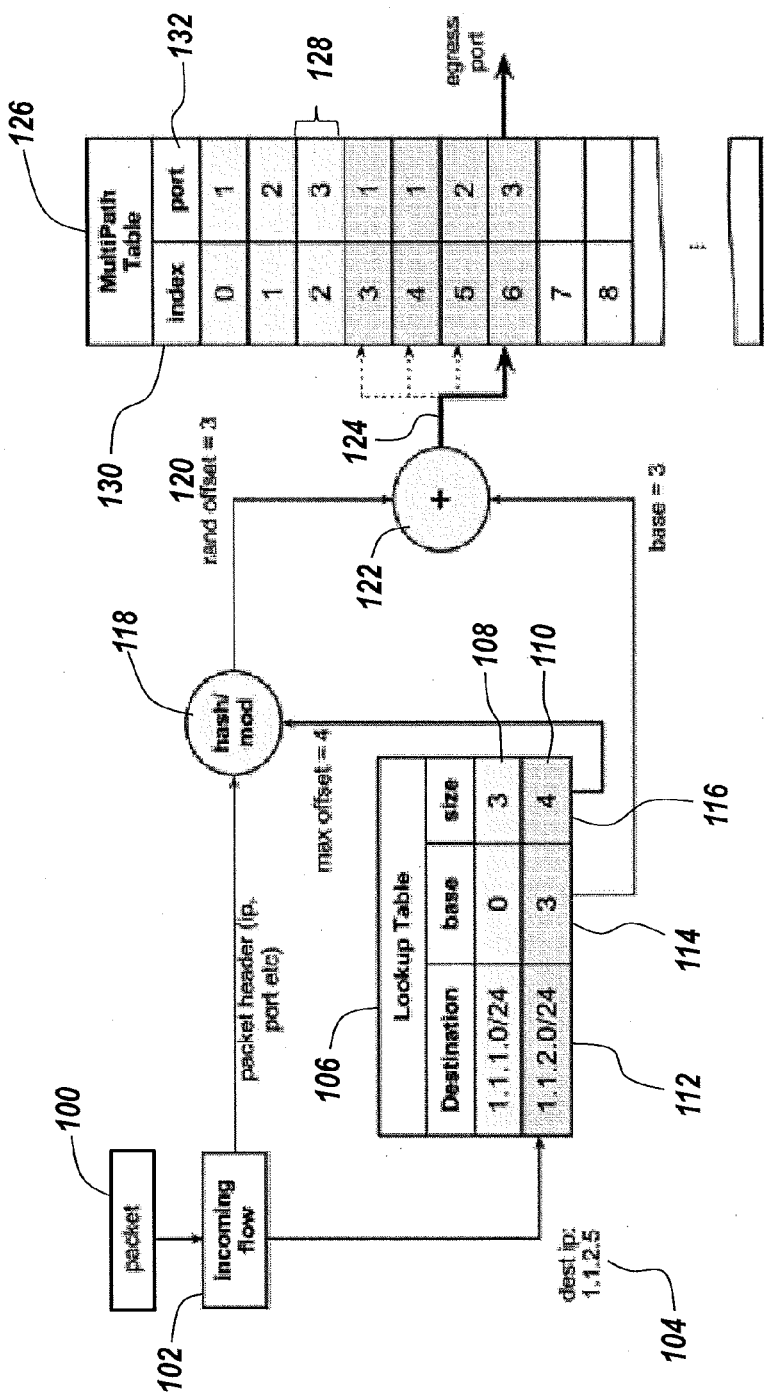
FIG. 1 depicts routing of a data packet in a network using conventional routing techniques.

FIG. 1 illustrates routing of a data packet in a network using conventional routing techniques. The routing technique identifies the egress port of the switch where the data packet will be forwarded. As depicted in FIG. 1, when a data packet 100 enters a switch 102 having multiple egress ports, the switch 102 must determine which egress port to use for forwarding the data packet 100. In various embodiments, each port of the switch 102 may be connected to a different network device. In some embodiments, more than one of the egress ports of the switch 102 may be connected to a same network device.

Upon receiving the data packet 100 at the switch 102, the destination IP address 104 of the data packet 100 is matched against components 108, 110 in a lookup table 106. The components 108, 110 of the lookup table 106 may each correspond to a routing rule of the network. As illustrated in FIG. 1, each components 108, 110 of the lookup table 106 may include a destination IP address 112, a base value 114 and a size value 116 associated therewith. The destination IP address 104 of the data packet 100 may be compared to the destination IP addresses 112 of the components 108, 110. For example, in the example illustrated in FIG. 1, the destination IP address 104 of the data packet 100 is (1.1.2.5). This IP address best corresponds to destination IP address 112 of component 110 which has the value of (1.1.2.0/24).

When the component 110 is identified in the lookup table 106, the egress port of the switch 102 is determined using the base value 114 and the size value 116 associated with the component 110. For example, the size value 116 of component 110 may be used as a modulo-base in a hash/mod function 118 to obtain a hash value using the packet header of the data packet 100. The packet header may include, for example, the source and destination IP addresses, port numbers, etc. A modulo function of the hash/mod function 118 may be applied to the hash value. The modulo function may yield to a random offset value 120. The random offset value 120 may be in the range of [0, size −1]. In the example illustrated in FIG. 1, the size value 116 associated with the component 110 is 4. Accordingly, the random offset value 120 may be in the range of [0, 3]. For example, the random offset value 120 may be 3. The random offset value 120 may be added to the previously obtained base value 114 using a sum function 122 to produce a final position value 124. The final position value 124 is then used to lookup the egress port value in a multipath table 126.

The multipath table 126 may include item pairs 128 that each have an index 130 and a corresponding egress port 132. The final position value 124 may be matched against the indices 130 in the multipath table 126 to determine the egress port 132 for the data packet 100.

The index is determined as follows:

index value (6)=base value (3)+random offset value (3).

Thus, in the example illustrated in FIG. 1, where the random offset value 120 is 3, the egress port 132 is determined using the index 130 equivalent to 6. In the multipath table 126, the index 130 equivalent to 6 corresponds to egress port 132 equivalent to 3.

In FIG. 1, the traffic with destination subset 1.1.2.0/24, i.e. entry 110 of the lookup table 106, will be uniformly randomly distributed among position indices 130 having values of 3-6. The corresponding egress ports 132 indicate that two data elements in the same traffic will be forwarded on the egress port 1, one data element in the traffic will be forwarded on each of the egress ports 2 and 3. Therefore, the routing scheme illustrated in FIG. 1 has the traffic load balancing ratio of 2:1:1 among egress ports 1, 2 and 3. That is, twice the traffic flows destined to subnet 1.1.2.0/24 will be routed to egress port 1 than egress ports 2 or 3.

According to the routing scheme of FIG. 1, each traffic group will have to occupy a physical block consisting of a set of consecutive entries in the multipath table 126, as the lookup is determined by two parameters, the "base" and the "size", where the size determines the maximum offset from the base due to hash/modulo operations. Accordingly, the size of the multipath table 126 grows dramatically as the number of routing rules in the lookup table 106 increases with the scale and complexity of the network. The multipath table 126, though extremely efficient and fast for lookup, is relatively small in size and expensive in cost. Thus, the number of the routing rules supported by the switch is limited. If the number of routing rules is too great, the network may be forced to operate in reduced performance with simpler rules (e.g. instead of using multipath routing weights ratio 1:2:3 which require block of size 6, using multipath routing weights ratio 1:1:1 which needs block of size 3), in order to fit into the multipath table 126.

The present application provides algorithms to reduce the required total space in the multipath table for a given set of routing rules without compromising the number of routing rules that are desired to be programmed into the multipath table.

In the present application, the following notations are used.

P represents the set of egress ports for WCMP load balancing, the number of egress ports is denoted by $|P|=p$. For example, if every switch has four egress ports, P={1, 2, 3, 4}.

A building block B is defined as an unordered enumeration of egress ports from P, where a port number in P can appear zero or more times in the building block. For example, B1={1, 1, 2, 3, 4} is a building block, and B1 is equivalent to B2={1, 2, 3, 4, 1}. B3={1, 2, 3, 3} is another building block where the egress port 4 is not included in the building block.

$N_i(B)$ denotes the number of times egress port i appears in building block B.

Two building blocks A and B, $A \subseteq B$ if and only if $i \in P$, $N_i(A) \leq N_i(B)$.

Two building blocks A and B, $C=A \cap B$ if and only if $i \in P$, $N_i(C)=\min(N_i(A), N_i(B))$.

Two building blocks A and B, $C=A \cup B$ if and only if $i \in P$, $N_i(C)=\max(N_i(A), N_i(B))$.

Two building blocks A and B where $A \subseteq B$, $C=B-A$ if and only if $i \in P$, $N_i(C)=(N_i(B)-N_i(A))$.

Any two building blocks A and B, $C=B-A$ means $C=B-(A \cap B)$.

N(B) counts the number of occurrence of port numbers in building block B. Therefore, $N(B)=\Sigma N_i(B)$ for $i \in P$.

R(B) is the set of rules which occupy building block B.

The notions defined above can be extended to a set of building block B.

A routing rule R is a building block where the weight of an egress port i is represented by the number of times the egress port i appears in the building block B. R can also be expressed by the union of a set of building blocks. For example, R={1, 1, 2, 3, 4} represents a routing rule where the weights of egress ports 1-4 have the traffic load balancing ratio of 2:1:1:1. R can be represented by the union of building blocks B1={1, 2, 3} and B2={1, 4}.

R represents the set of routing rules need to be programmed into the multipath table. The number of routing rules is denoted by |R|=r. N(R) denotes the number of entries needed to implement R in the multipath table.

In the present application, a first observation to combine the routing rules into a same building block may be stated as follows:

Given two routing rules A and B, if A⊂B, there exists a solution that satisfies $$N(R=\{A, B\})=N(B).$$

Figure 2A:
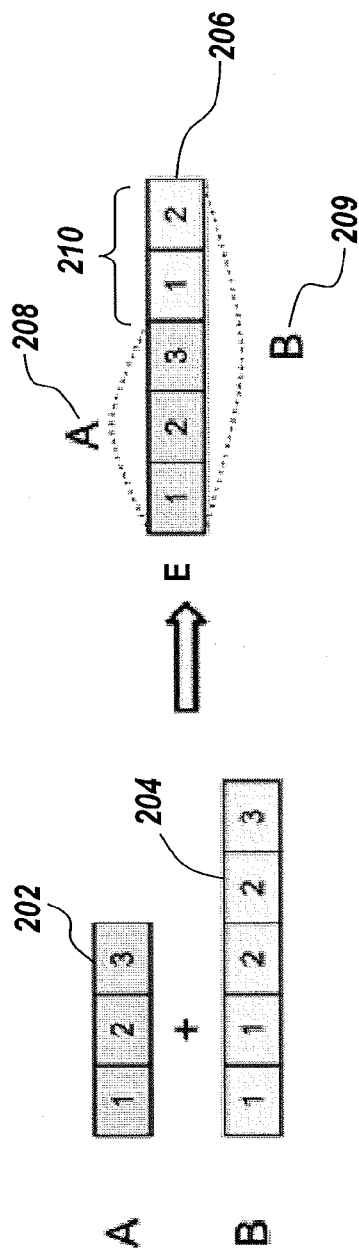
FIG. 2A illustrates entering two routing rules into a multipath table where the first routing rule is a subset of the second routing rule.

The first observation is illustrated in FIG. 2A. Two routing rules 202 and 204 are provided in FIG. 2A. The first routing rule 202 is represented as A={1, 2, 3} and the second routing rule 204 is represented as B={1, 1, 2, 2, 3}. The first routing rule 202 and the second routing rule 204 each represent a traffic load balancing ratio. The traffic load balancing ratio represented by the first routing rule 202 is 1:1:1. That is, port 1, port 2 and port 3 each receive equal amount of network traffic. The traffic load balancing ratio represented by the second rule 204 is 2:2:1. That is, ports 1 and 2 receive double the amount of network traffic than port 3.

In the example illustrated in FIG. 2A, the first routing rule 202 is a complete subset of the second routing rule 204. Thus, the first routing rule 202 and the second routing rule 204 may be programmed into the multipath table as exemplary building block 206 E={1, 2, 3, 1, 2}. One of ordinary skill in the art will appreciate that the building block E 206 is one possible solution that combines the first routing rule 202 and the second routing rule 204 and that other alternative building blocks are possible as long as both rules are properly programmed into the multipath table.

The building block E 206 may be formed by two smaller building blocks, the building block (A) 208 and the building block (B-A) 210. The occupying routing rules for the building block (A) 208 is R(A)={A, B} as the building block (A) 208 is occupied by both the first rule 202 and the second rule 204. The occupying routing rules for the building block (B-A) 210 is R(B-A)={B} as the building block (B-A) 210 is occupied only by the second rule 204. Accordingly, fully overlapping routing rules may be combined to occupy less physical space in the multipath table than if the routing rules were programmed individually into the multipath table.

In the present application, a second observation to combine the routing rules into the same building block may be stated as follows:

Given two routing rules A and B, if A∩B≠∅, there exists a solution that satisfies $$N(R=\{A, B\})=N(A\cup B).$$

Figure 2B:
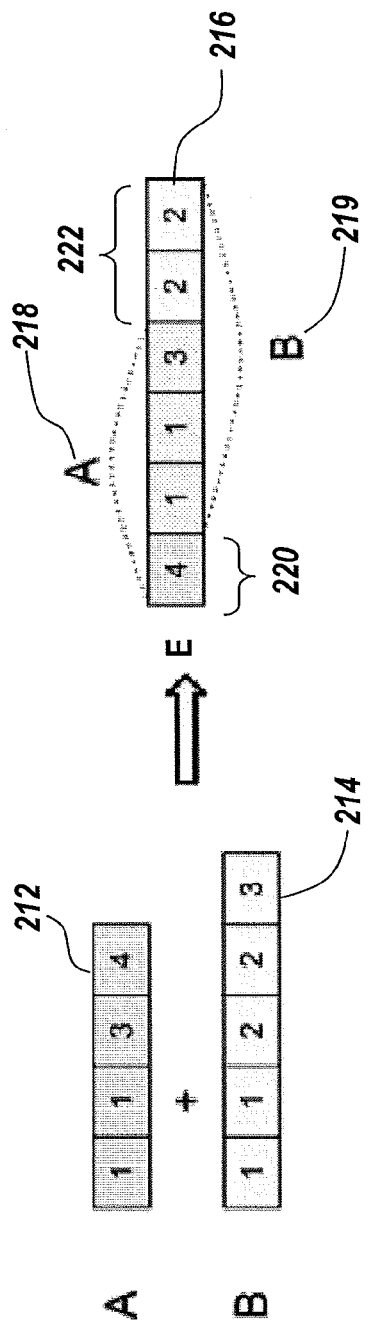
FIG. 2B illustrates entering two routing rules into a multipath table where the first routing rule and the second routing rule partially overlap.

The second observation is illustrated in FIG. 2B. Two routing rules 212 and 214 are provided in FIG. 2B. The first routing rule 212 is represented as A={1, 1, 3, 4} and the second routing rule 214 is represented as B={1, 1, 2, 2, 3}. The first routing rule 212 and the second routing rule 214 partially overlap. Thus, the first routing rule 212 and the second routing rule 214 can be programmed into the multipath table as exemplary building block 216 E={4, 1, 1, 3, 2, 2}. One of ordinary skill in the art will appreciate that the building block E 216 is one possible solution that combines the first routing rule 212 and the second routing rule 214 and that other alternative building blocks are possible as long as both rules are properly programmed into the multipath table.

According to various embodiments, the building block E 216 may be formed by shuffling the entries in a first rule and appending or pre-pending the entries of a second rule to the first rule. One of skill in the art will appreciate that shuffling the entries in a rule does not affect the traffic load balancing ratio defined by that rule. For example, in the exemplary embodiment illustrated in FIG. 2B, the entries of the first rule 212 are shuffled to form the building block (A) 218 without modifying the traffic load balancing ratio of 2:0:1:1. The entries of the second rule 214 are also shuffled to form the building block (B) 219 without modifying the traffic load balancing ratio of 2:2:1:0. The building block (A) 218 is pre-pended to the building block (B) 219 to form the building block E 216.

The building block E 216 may be formed by three smaller building blocks, the building block (A-B) 220, the building block (A∪B) 216, and the building block (B-A) 222. The occupying routing rules for each building block 220, 216 and 222 is R(A-B)={A}, R(A∪B)={A, B}, R(B-A)={B}. Accordingly, partially overlapping routing rules may be combined to occupy less physical space in the multipath table than if the routing rules were programmed individually into the multipath table.

Figure 3:
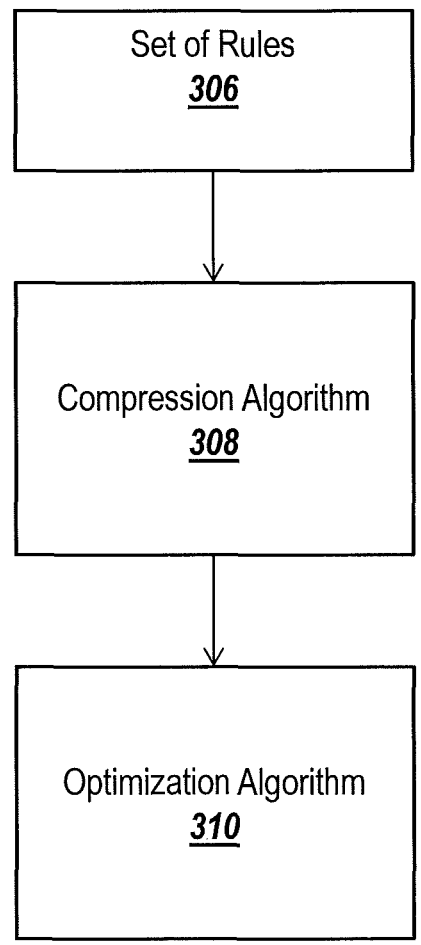
FIG. 3 is a flowchart describing how to reduce the amount of data to be stored in a multipath table.

Using the foregoing observations, it is possible to reduce the amount of data to be stored in a multipath table in a network. The routing rules for a hardware device may be determined by the network manager or upper layer services of the network. For a given set of routing rules, the present application may apply a compression algorithm and, optionally, an optimization algorithm. The approach is illustrated in FIG. 3. At step 306, the set of routing rules are received for programming into a multipath table associated with a hardware element of a network. At step 308, a compression algorithm may be applied to the received set of routing rules. The compression algorithm may reduce the amount of data associated with the routing rules to be programmed into the multipath table. The present application preserves all the routing rules and programs all of the received routing rules into the multipath table. Thus, the compression of the data to be stored in the multipath table is lossless. According to various embodiments, an optimization algorithm may be applied to the compressed set of rules at step 310. The compression algorithm and the optimization algorithm are discussed below in greater detail in connection with FIGS. 4 and 5, respectively.

Figure 4:
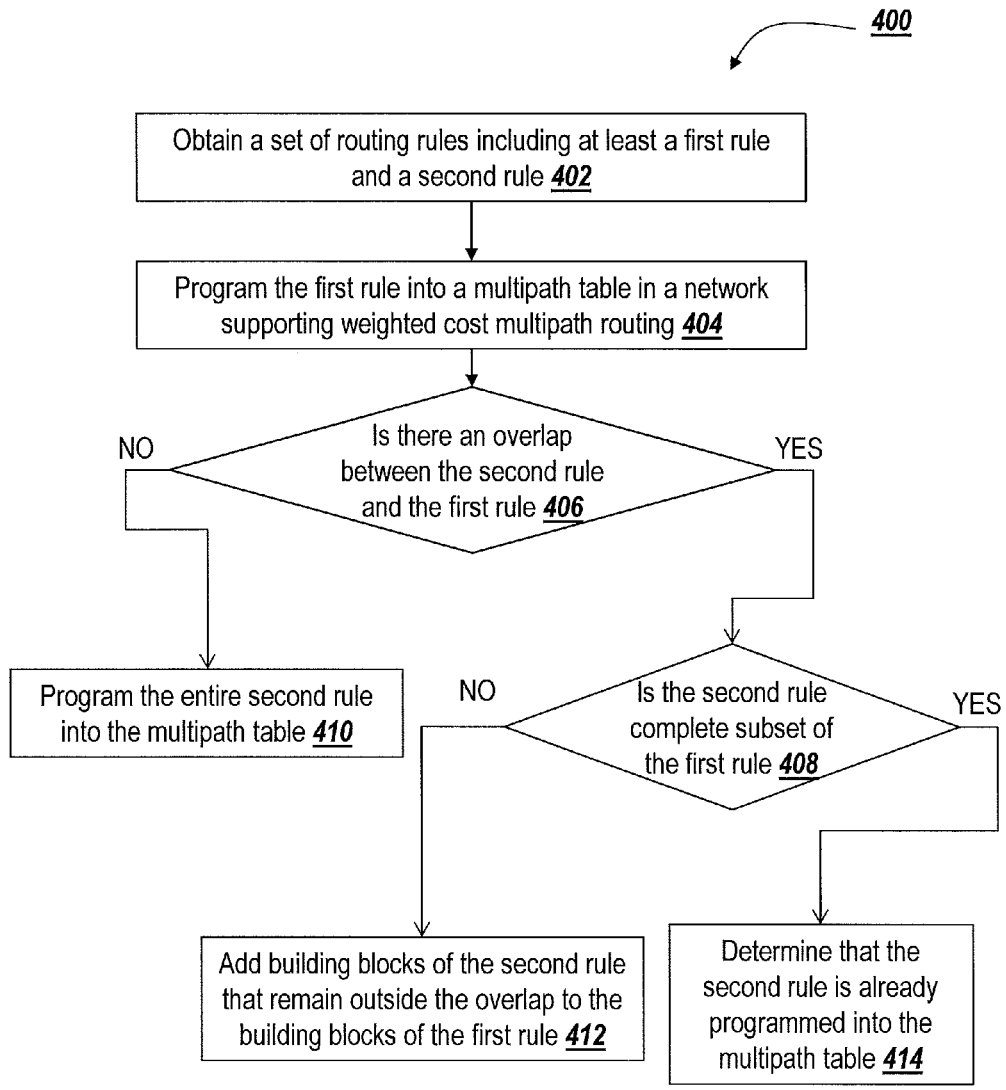
FIG. 4 is a flowchart describing a compression algorithm to reduce the number of data to be stored in a multipath table.

FIG. 4 illustrates an exemplary compression algorithm 400 according to various embodiments. At step 402, a set of routing rules are obtained. The set of routing rules includes a first rule and a second rule. At step 404, the first rule is programmed into a multipath table associated with one or more hardware devices of a network. The network may support WCMP routing. Programming the routing rules into the multipath table may be accomplished by storing building blocks in the multipath table, as discussed above in connection with FIGS. 2A-2B. In addition, as discussed above in connection with FIG. 2B, the entries of the first rule may be shuffled before programming the first rule into the multipath table. The shuffling of the entries in a rule does not modify the traffic load balancing ratio defined by that routing rule.

At step 406, it is determined whether the second rule overlaps with the first rule. If the second rule overlaps with the first rule (YES to step 406), it is determined whether the overlap is a complete overlap, i.e. the second rule is a subset of the first rule (step 408). If the second rule is a complete subset of the first rule (YES to step 408), the second rule is considered to be already programmed into the multipath table (step 414)

because the first rule that encompasses the second rule has been previously programmed into the multipath table at step 404.

If there is an overlap between the second rule and the first rule (YES to step 406) but the second rule is not a complete subset of the first rule (NO to step 408), the second rule is programmed into the multipath table by adding to the building blocks of the first rule the building blocks of the second rule which remain outside the overlap (step 412). As discussed above in connection with FIG. 2B, the second rule may be programmed into the multipath table by appending or pre-pending one or more building blocks to the one or more building blocks of the first rule that are already programmed into the multipath table.

If there is no overlap between the second rule and the first rule (NO to step 406), the first rule and the second rule may not be compressed. Thus, the second rule will be programmed into the multipath table as is, i.e. without compression (step 410).

The exemplary compression algorithm discussed in connection with FIG. 4 may be implemented using a greedy algorithm as follows:

```
Function Main ():
  while (R≠∅) {
    R=R.pop_front {};
    <L*, R*, I*, M*>=<-1, -1, -1, N(R)>;
    for (i=0; i<=|B|; ++i) {
      <L, R, I, M>=Greedy(B, i, R);
      if (M*>M) {
        <L*, R*, I*, M*>=<L, R, I, M>;
      }
      if (M*==0) break;
    }
    Update (R, B, <L*, R*, I*, M*>);
  }
Function Greedy(B, i, R):
  // Grow the building blocks towards the right as long as they
  // can be covered by R.
  right=i+1;
  s=∅;
  while (Exist(B_right) && {S,B_right}⊆R) {
    S.append(B_right)
    right++;
  }
  if (R⊆(B_L, S, B_right)) {
    return<i, right, -1, 0>;
  } else {
    // Find a location where we can insert extra building
        blocks
    // without breaking the rules which are already pro-
        grammed.
    for (k=i; k<right; k++) {
      if (R(B_K)==∅||R(B_{K-1})==∅||R(B_K)∩R(B_{K-1})==∅) {
        M=N(R)-N(R∩(B_L, S, B_right));
        return<i, right, k, M>;
      }
    }
    return<-1, -1, -1, N(R)>;
  }
Function Update (R, B, <L*, R*, I*, M*>):
  if (<L*, R*, I*, M*>==<-1, -1, -1, N(R)>) {
    B=new Block(R);
    R(B)=R;
    B.append(B);
  } else {
    s=∅;
    for (k=L*+1; k<R*; k++) {
      R(B_K).add(R);
      S.append(B_k);
    }
    if (Exist(B_L*) {
      B_L=B_L*∩(R-S);
      if (B_L!=∅) {
        R(B_L)=R(B_L*)+R;
        B_LL=B_L*-B_L;
        R(B_LL)=R(B_L*);
        {
        }
      }
      if (I* !=-1) {
        B_R=B_R*∩(R-S-B_L);
        if (B_R!=∅) {
          R(B_R)=R(B_R*)=R;
          B_RR=B_R*-B_R;
          R(B_RR)=R(B_R*);
        }
      }
    }
    if (I* !=-1) {
      B_I=R-S-B_L B_R;
      R(B_I)=R;
      B.insert_at_pos(I*, B_I);
    }
    if (B_L!=∅) B.replace(B_L*, {B_LL, B_L});
    if (B_R!=∅) B.replace(B_R*, {B_RR, B_L});
  }
```

The greedy algorithm provided above may not produce a globally optimal solution while the problem is N-P hard. An optimization algorithm may be applied to the set of routing rules following the greedy algorithm to increase the chance of finding the optimal solution. According various embodiments, the optimization algorithm may change the ordering of the routing rules in the iterations. For example, the routing rules may be ordered by the increasing and/or decreasing value of N(R). The compression algorithm may be run over a set of randomly ordered routing rules (variations of R), and the best, e.g. more compact, solution may be selected over the iterations. This approached may be deemed as equivalent to randomizing the greedy algorithm discussed above.

Figure 5:
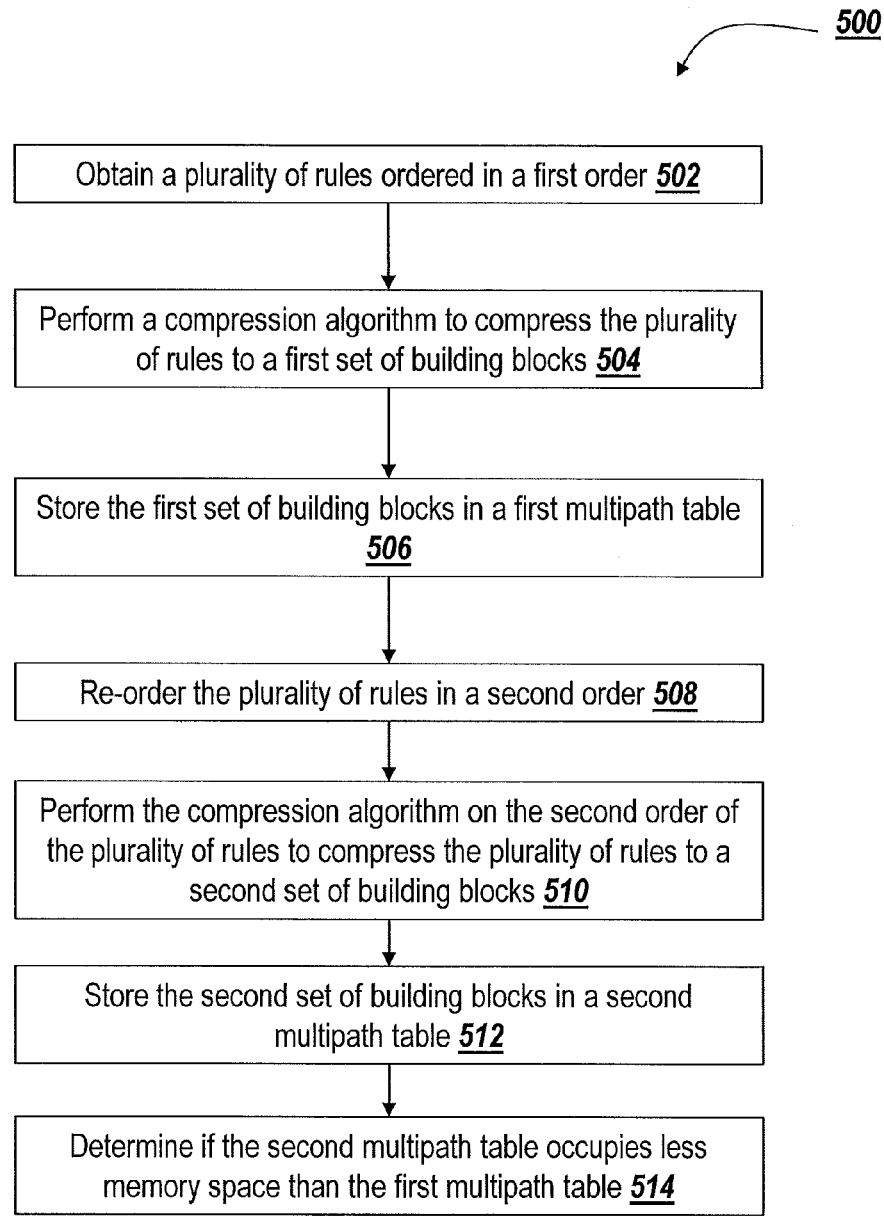
FIG. 5 is a flowchart describing an optimization algorithm that may be applied following the compression algorithm illustrated in FIG. 4.

FIG. 5 illustrates an exemplary optimization algorithm 500 that modifies the ordering of the routing rules in a given set of routing rules. At step 502, a plurality of routing rules are obtained as arranged in a first order. A compression algorithm, such as one discussed in connection with FIG. 4, is performed on the plurality of routing rules ordered in the first order to compress the rules into a first reduced set of building blocks (step 504). The first set of building blocks is stored in a first multipath table (step 506). The plurality of rules that are obtained at step 502 are re-ordered in a second order (step 508). The compression algorithm is performed on the plurality of routing rules ordered in the second order to compress the rules into a second set of building blocks (step 510). The second set of building blocks is stored in a second multipath table (step 512). The second multipath table is compared to the first multipath table to determine whether the second multipath table occupies less memory space than the first multipath table (step 514). As a result, the multipath table that occupies the less space may be deemed to be the optimal solution.

According to various embodiments, it is possible that using the routing rules as provided or merely shuffling the entries within the routing rules may not necessarily produce the optimal solution. One such example is illustrated in FIGS. 6A-6B.

FIG. 6A illustrates three routing rules, rule A 602, rule B 604 and rule C 606 that will be programmed into a multipath table. Using a compression algorithm, such as the compression algorithm 400 discussed above in connection with FIG. 4, it may be determined that rule A 602 and rule B 604 overlap, i.e. rule A 602 is a subset of rule B 604. It may also be determined that rule B and rule C partially overlap. Using the compression algorithm 400, rule A 602, rule B 604 and rule C 606 may be programmed to the multipath table using the building block 610.

As illustrated in FIG. 6B, an additional rule D 608 may be desired to be added to the same multipath table as rule A 602, rule B 604 and rule C 606. Reshuffling the elements of rule C 606 and rule D 608 within each respective rule may allow programming all four rules into the multipath table as building block 612. Accordingly, if the rules A, B, C and D remain unchanged, the most optimal solution requires 14 multipath table entries. However, there may be a better solution, i.e. a building block with less entries, for programming all four rules A, B, C and D into the multipath table.

According to an option, rule D 608 may be scaled up. Scaling up a rule does not modify the traffic load balancing ratio defined by the rule. For example, pre-scaling, rule D 608 has the traffic load balancing ratio of 1:1:1:1. That is, port 1, port 2, port 3 and port 4 each receive equal amount of network traffic. The rule D 608 may be scaled up by a factor of 2 to produce scaled rule D' 618 that has the traffic load balancing ratio of 2:2:2:2. Accordingly, after scaling, port 1, port 2, port 3 and port 4 still receive equal amount of network traffic. Using the scaled rule D' 618, the four rules A, B, C and D may be entered into a multipath table using the building block 614 that includes 12 entries. Accordingly, an improvement to the above greedy algorithm may be to supply R, 2R, . . . , up to K*R for a small constant K to the Greedy() function call.

Figure 7:
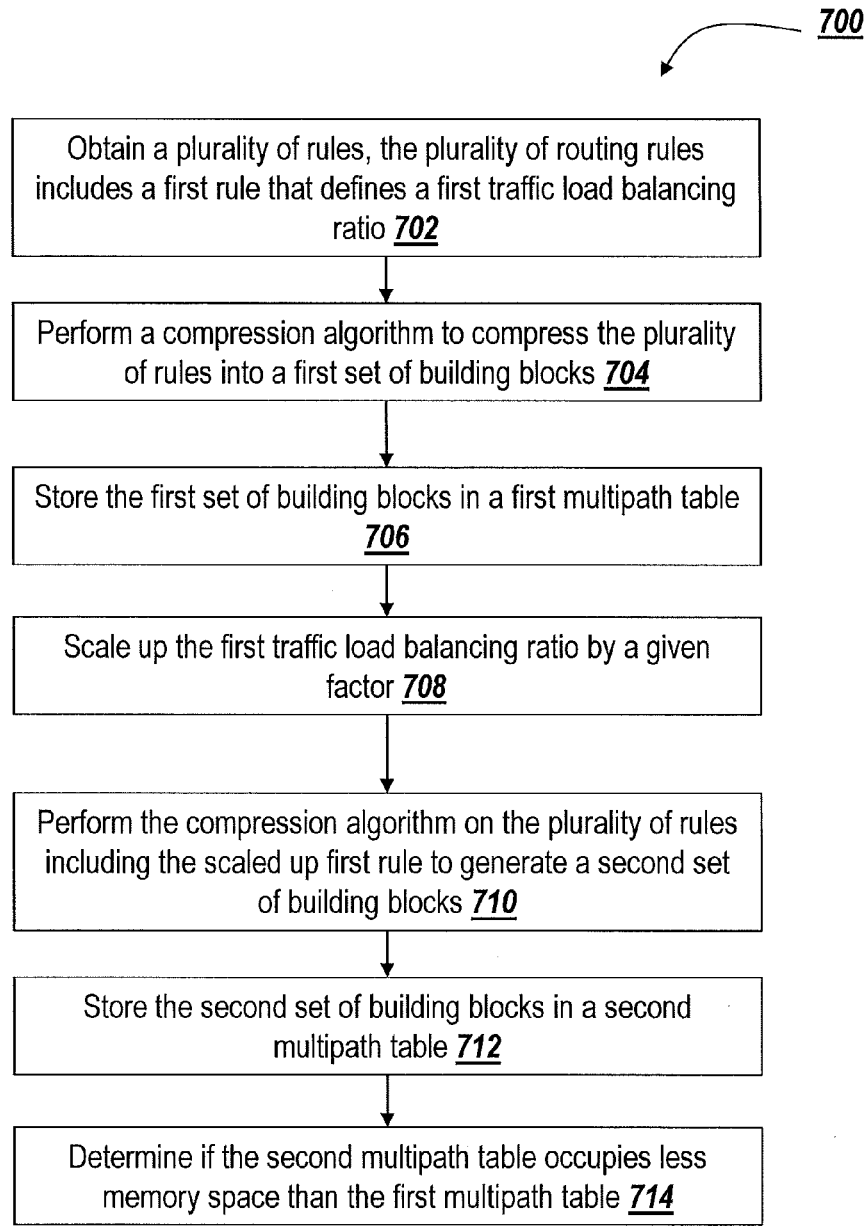
FIG. 7 is a flowchart illustrating an exemplary compression algorithm that uses scaling for one or more of the rules.

FIG. 7 illustrates an exemplary compression algorithm 700 that uses scaling for one or more of the routing rules. At step 702, a plurality of routing rules is obtained. The plurality of rules may include a first rule defining a first traffic load balancing ratio. A compression algorithm, such as one discussed in connection with FIG. 4, is performed on the plurality of routing rules to compress the plurality of routing routes into a first set of building blocks (step 704). The first set building blocks is stored in a first multipath table (step 706). The first rule is scaled up by increasing the first traffic load balancing ratio by a given factor to produce a scaled up first rule (step 708). One of ordinary skill in the art would appreciate that the scaling may be performed on any given rule of the plurality of routing rules. In addition, the scaling may be performed more than once. In some embodiments, with each iteration of scaling, a different rule among the plurality of routing rules may be scaled up.

When the first rule, i.e. a given rule, is scaled up, the compression algorithm is performed on the plurality of routing rules including the scaled up first rule to generate a second set of building blocks (step 710). The second set of building blocks is stored in a second multipath table (step 712). The second multipath table is compared to the first multipath table to determine whether the second multipath table occupies less memory space than the first multipath table (step 714). As a result, the multipath table that occupies the less space may be deemed to be the optimal solution.

Figure 8:
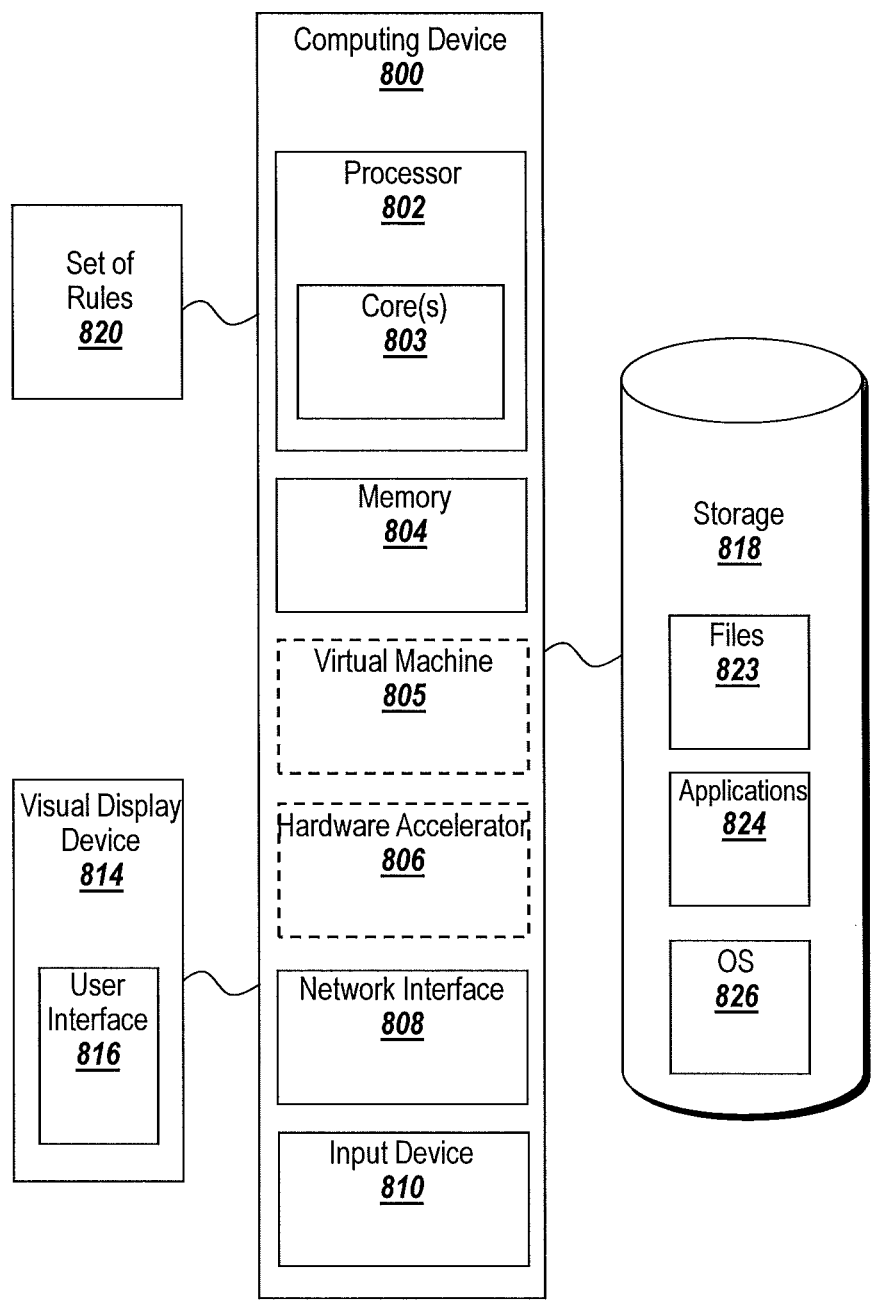
FIG. 8 depicts an exemplary computing device suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 8 depicts an example of an electronic device 800 that may be suitable for use with one or more acts disclosed herein.

The electronic device 800 may take many forms, including but not limited to a computer, workstation, server, network computer, quantum computer, optical computer, Internet appliance, mobile device, a pager, a tablet computer, a smart sensor, application specific processing device, etc.

The electronic device 800 is illustrative and may take other forms. For example, an alternative implementation of the electronic device 800 may have fewer components, more components, or components that are in a configuration that differs from the configuration of FIG. 8. The components of FIG. 8 and/or other figures described herein may be implemented using hardware based logic, software based logic and/or logic that is a combination of hardware and software based logic (e.g., hybrid logic); therefore, components illustrated in FIG. 8 and/or other figures are not limited to a specific type of logic.

The processor 802 may include hardware based logic or a combination of hardware based logic and software to execute instructions on behalf of the electronic device 800. The processor 802 may include logic that may interpret, execute, and/or otherwise process information contained in, for example, the memory 804. The information may include computer-executable instructions and/or data that may implement one or more embodiments of the invention. The processor 802 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 803. Moreover, the processor 802 may include a system-on-chip (SoC) or system-in-package (SiP).

The electronic device 800 may include one or more tangible non-transitory computer-readable storage media for storing one or more computer-executable instructions or software that may implement one or more embodiments of the invention. The non-transitory computer-readable storage media may be, for example, the memory 804 or the storage 818. The memory 804 may comprise a ternary content addressable memory (TCAM) and/or a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 800 may include a virtual machine (VM) 805 for executing the instructions loaded in the memory 804. A virtual machine 805 may be provided to handle a process running on multiple processors so that the process may appear to be using only one computing resource rather than multiple computing resources. Virtualization may be employed in the electronic device 800 so that infrastructure and resources in the electronic device may be shared dynamically. Multiple VMs 805 may be resident on a single computing device 800.

A hardware accelerator 806, may be implemented in an ASIC, FPGA, or some other device. The hardware accelerator 806 may be used to reduce the general processing time of the electronic device 800.

The electronic device 800 may include a network interface 808 to interface to a Local Area Network (LAN), Wide Area Network (WAN) or the Internet through a variety of connections including, but not limited to, standard telephone lines, LAN or WAN links (e.g., T1, T3, 76 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 808 may include a built-in network adapter, network interface card, personal computer memory card international association (PCMCIA) network card, card bus network adapter, wireless network adapter, universal serial bus (USB) network adapter, modem or any other device suitable for interfacing the electronic device 800 to any type of network capable of communication and performing the operations described herein.

The electronic device 800 may include one or more input devices 810, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 800 may include other suitable I/O peripherals.

The input devices 810 may allow a user to provide input that is registered on a visual display device 814. A graphical user interface (GUI) 816 may be shown on the display device 814.

A storage device 818 may also be associated with the computer 800. The storage device 818 may be accessible to the processor 802 via an I/O bus. The information may be executed, interpreted, manipulated, and/or otherwise processed by the processor 802. The storage device 818 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 818 may further store applications 824, and the electronic device 800 can be running an operating system (OS) 826. Examples of OS 826 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 9:
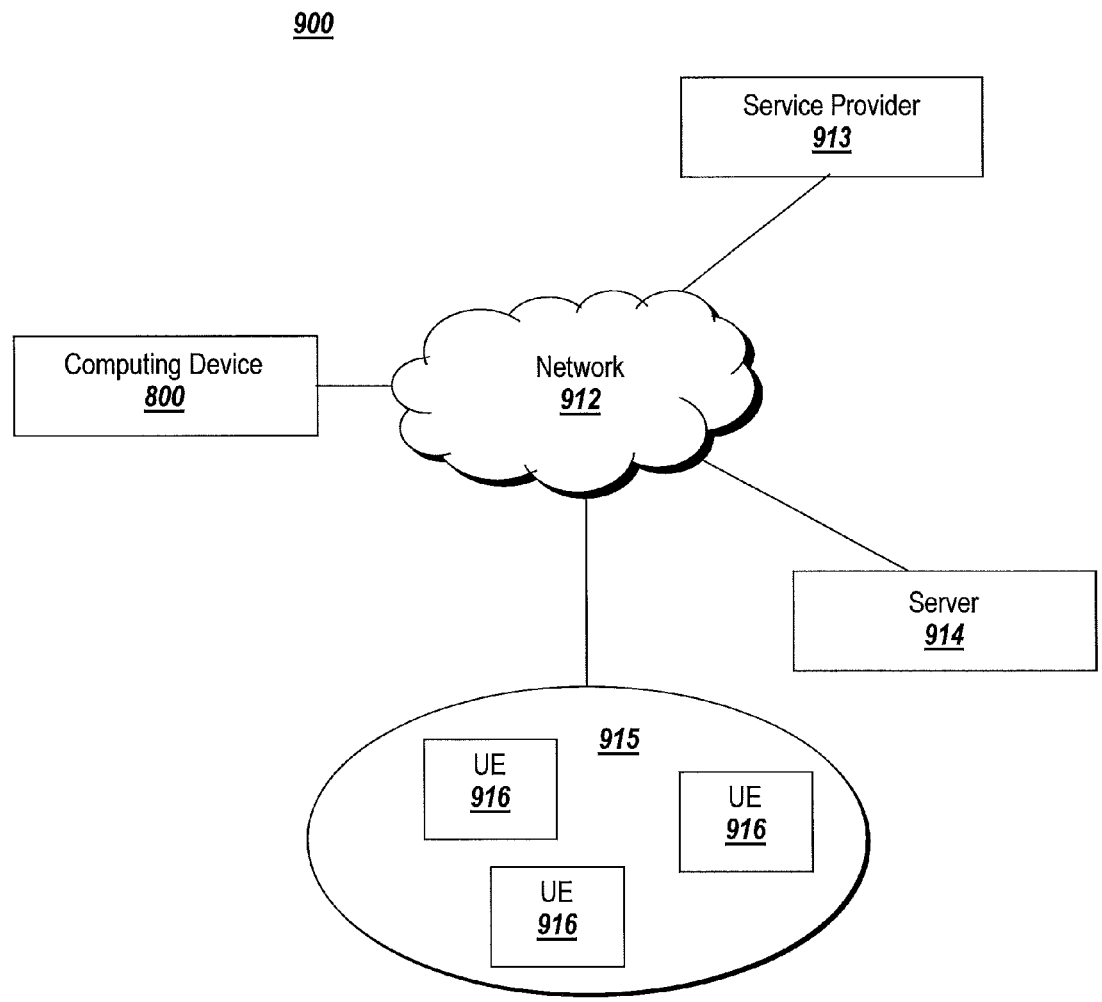
FIG. 9 depicts an exemplary network implementation of processing performed according to an exemplary embodiment.

FIG. 9 depicts a network implementation that may implement one or more embodiments of the invention. A system 900 may include the computing device 800, a network 912, a service provider 913, a target environment 914, and a cluster 915. The system 900 may be a distributed system including a plurality of computing nodes, i.e. units of execution 916, that implement one or more embodiments of the invention. The embodiment of FIG. 9 is exemplary, and other embodiments can include more devices, fewer devices, or devices in arrangements that differ from the arrangement of FIG. 9.

The network 912 may transport data from a source to a destination. Embodiments of the network 912 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 800, the service provider 913, etc.). Data may include digital information or analog information. Data may further be packetized and/or non-packetized.

The network 912 may be a hardwired network using wired conductors and/or optical fibers and/or may be a wireless network using free-space optical, radio frequency (RF), and/or acoustic transmission paths. In one implementation, the network 912 may be a substantially open public network, such as the Internet. In another implementation, the network 912 may be a more restricted network, such as a corporate virtual network. The network 912 may include Internet, intranet, Local Area Network (LAN), Wide Area Network (WAN), Metropolitan Area Network (MAN), wireless network (e.g., using IEEE 802.11), or other type of network The network 912 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 913 may include a device that makes a service available to another device. For example, the service provider 913 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 914 may include a device that receives information over the network 912. For example, the server 914 may be a device that receives user input from the computer 800.

The cluster 915 may include a number of units of execution (UEs) 916 and may perform processing on behalf of the computer 800 and/or another device, such as the service provider 913 or server 914. For example, the cluster 915 may perform parallel processing on an operation received from the computer 800. The cluster 915 may include UEs 916 that reside on a single device or chip or that reside on a number of devices or chips.

The units of execution (UEs) 916 may include processing devices that perform operations on behalf of a device, such as a requesting device. A UE may be a microprocessor, field programmable gate array (FPGA), and/or another type of processing device. UE 916 may include code, such as code for an operating environment. For example, a UE may run a portion of an operating environment that pertains to parallel processing activities. The service provider 913 may operate the cluster 915 and may provide interactive optimization capabilities to the computer 800 on a subscription basis (e.g., via a web service).

Units of Execution (UEs) may provide remote/distributed processing capabilities for the applications 924. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless stated otherwise. The conjunction "or" is meant to be inclusive, unless stated otherwise.

It is intended that the invention not be limited to the particular embodiments disclosed above, but that the invention will include any and all particular embodiments and equivalents falling within the scope of the following appended claims.

The invention claimed is:

1. A computer-implemented method comprising:
   obtaining, using a computer, a plurality of routing rules ordered in a first order;
   performing, using the computer, a compression algorithm on the plurality of routing rules to compress the plurality of routing rules into a first set of building blocks by determining two or more of the plurality of routing rules that overlap;
   storing, using the computer, the first set of building blocks in a first multipath table of a network supporting weighted cost multipath routing;
   re-ordering, using the computer, the plurality of routing rules in a second order;
   performing, using the computer, the compression algorithm on the re-ordered plurality of routing rules, wherein the performing comprises:
      compressing the re-ordered plurality of routing rules to a second set of building blocks by determining two or more of the re-ordered plurality of routing rules that overlap;
      storing, using the computer, the second set of building blocks in a second multipath table; and
      determining, using the computer, if the second multipath table occupies less memory space than the first multipath table.

2. The method of claim 1, wherein:
   a first rule of the plurality of routing rules and a second rule of the plurality of routing rules each includes one or more entries, and
   performing the compression algorithm on the plurality of routing rules comprises:
      programming the first rule into the first multipath table by adding the one or more entries of the first rule into the first multipath table;
      determining that there is an overlap between the second rule and the first rule; and
      adding, to the first multipath table, one or more remaining entries of the second rule that remain outside the overlap to the one or more entries of the first rule that are previously added to the first multipath table.

3. The method of claim 2, wherein if the second rule is a complete subset of the first rule, determine that all of the one or more entries of the second rule are already added to the first multipath table.

4. The method of claim 2, wherein adding the one or more remaining entries of the second rule is performed by appending or pre-pending the one or more remaining entries of the second rule to the one or more entries of the first rule.

5. The method of claim 2, further comprising:
   shuffling the one or more entries of the first rule; or
   shuffling the one or more entries of the second rule.

6. The method of claim 2, further comprising:
scaling up the first rule by a first pre-determined factor such that a traffic load balancing ratio defined by the scaled up first rule is the same as a first traffic load balancing ratio defined by the first rule, wherein the scaling up adds one or more additional entries to the first rule; or
scaling up the second rule by a second pre-determined factor such that a traffic load balancing ratio defined by the scaled up second rule is the same as a second traffic load balancing ratio defined by the second rule, wherein the scaling up adds one or more additional entries to the second rule.

7. The method of claim 1, wherein the compression algorithm is a greedy algorithm.

8. A computer-implemented method comprising:
obtaining, using a computer, a plurality of routing rules, wherein a first rule of the plurality of rules includes one or more entries;
performing, using the computer, a compression algorithm to compress the plurality of routing rules into a first set of building blocks by determining two or more of the plurality of routing rules that overlap;
storing, using the computer, the first set of building blocks in a first multipath table of a network supporting weighted cost multipath routing;
scaling up, using the computer, the first rule by adding at least one additional entry to the one or more entries of the first rule;
performing, using the computer, the compression algorithm on the plurality of routing rules including the scaled up first rule to compress the plurality of routing rules into a second set of building blocks;
storing, using the computer, the second set of building blocks in a second multipath table; and
determining, using the computer, if the second multipath table occupies less memory space than the first multipath table.

9. The method of claim 8, wherein performing the compression algorithm on the plurality of routing rules comprises:
programming the first rule into the first multipath table by adding the one or more entries of the first rule into the first multipath table;
determining that there is an overlap between a second rule of the plurality of routing rules and the first rule; and
adding, to the first multipath table, one or more remaining entries of the second rule that remain outside the overlap to the one or more entries of the first rule that are previously added to the first multipath table.

10. The method of claim 9, wherein if the second rule is a complete subset of the first rule, determine that all of the one or more entries of the second rule are already added to the first multipath table.

11. The method of claim 9, wherein adding the one or more remaining entries of the second rule is performed by appending or pre-pending the one or more remaining entries of the second rule to the one or more entries of the first rule.

12. The method of claim 9, further comprising:
shuffling the one or more entries of the first rule; or
shuffling the one or more entries of the second rule.

13. The method of claim 9, wherein the first rule defines a first traffic load balancing ratio and the second rule defines a second traffic load balancing ratio.

* * * * *